(12) United States Patent
Lee

(10) Patent No.: US 7,606,131 B2
(45) Date of Patent: Oct. 20, 2009

(54) RECORDING CONTROL AND SPACE AREA MANAGEMENT APPARATUS AND METHOD FOR RECORDING ADDITIONAL DATA ON A REWRITABLE OPTICAL MEDIUM

(75) Inventor: Sang-am Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 888 days.

(21) Appl. No.: 10/947,441

(22) Filed: Sep. 23, 2004

(65) Prior Publication Data

US 2005/0152250 A1 Jul. 14, 2005

(30) Foreign Application Priority Data

Jan. 8, 2004 (KR) .................... 10-2004-0001111

(51) Int. Cl.
*G11B 7/0045* (2006.01)
(52) U.S. Cl. .................... 369/53.24; 369/53.31
(58) Field of Classification Search ............ 369/53.2, 369/53.31, 53.24, 47.23–47.24, 47.38, 47.47; 386/70, 125, 126
See application file for complete search history.

(56) References Cited

U.S. PATENT DOCUMENTS

| | | | | |
|---|---|---|---|---|
| 5,617,380 | A * | 4/1997 | Holmstrom | 369/275.1 |
| 5,878,020 | A * | 3/1999 | Takahashi | 369/59.25 |
| 5,930,827 | A * | 7/1999 | Sturges | 711/170 |
| 6,052,346 | A | 4/2000 | Arataki et al. | 369/47 |
| 6,292,625 | B1 * | 9/2001 | Gotoh et al. | 386/95 |
| 6,501,905 | B1 * | 12/2002 | Kimura | 386/126 |
| 6,904,229 | B1 * | 6/2005 | Suzuki et al. | 386/95 |
| 7,287,130 | B2 * | 10/2007 | Lee | 711/154 |
| 2001/0043227 | A1 * | 11/2001 | Shaw | 711/171 |
| 2003/0028740 | A1 * | 2/2003 | Challenger et al. | 711/170 |
| 2003/0167382 | A1 * | 9/2003 | Lee | 711/154 |
| 2003/0188094 | A1 * | 10/2003 | Ohbi et al. | 711/112 |

FOREIGN PATENT DOCUMENTS

| | | |
|---|---|---|
| EP | 0 905 699 | 3/1999 |
| EP | 1 126 454 | 8/2001 |
| JP | 09147533 | 6/1997 |
| JP | 2000-013728 | 1/2000 |
| JP | 2000-268506 | 9/2000 |
| JP | 2002-050131 | 2/2002 |
| JP | 2002077795 | 3/2002 |
| JP | 2002-117627 | 4/2002 |
| JP | 2003-059184 | 2/2003 |
| KR | 2002-0006273 | 1/2002 |
| WO | 01/01415 | 1/2001 |

OTHER PUBLICATIONS

European Search Report.

* cited by examiner

*Primary Examiner*—Andrea L Wellington
*Assistant Examiner*—Nathan Danielsen
(74) *Attorney, Agent, or Firm*—Roylance, Abrams, Berdo & Goodman, L.L.P.

(57) ABSTRACT

A recording apparatus and control method for recording additional data in a space block are provided. The recording operation is terminated if a corresponding space block is full when the additional recording is performed. A space area management method according to another embodiment of the present invention comprises the steps of generating space area information, updating the generated space area information for every recording/erasing, and storing the updated space area information in a disc according to a prescribed command.

24 Claims, 16 Drawing Sheets

FIG. 1
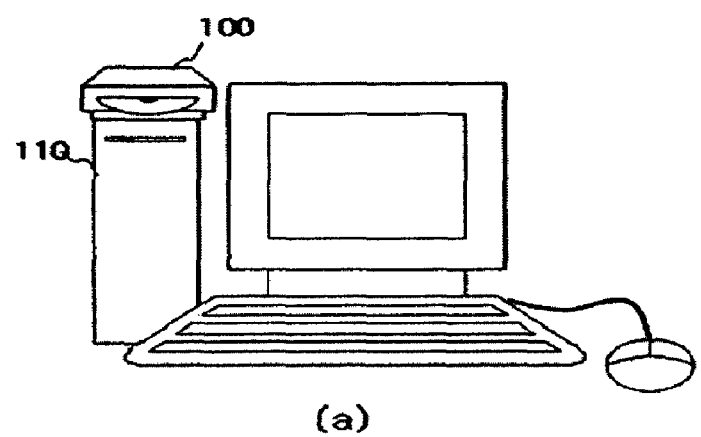
(a)
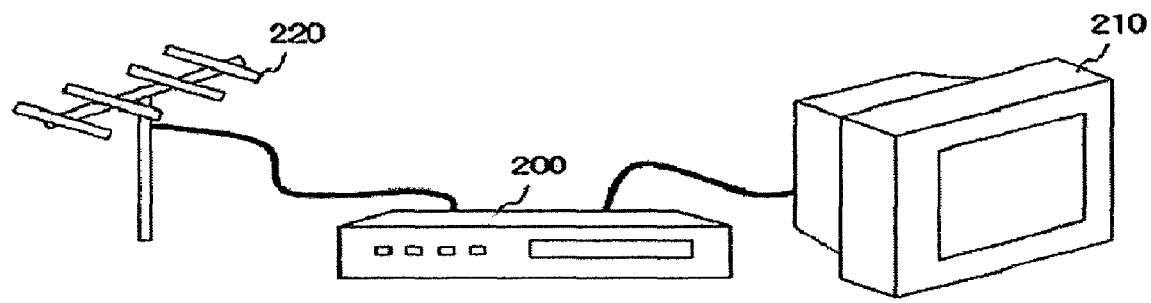
(b)
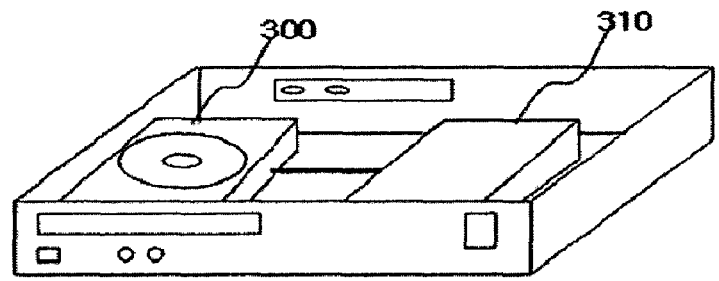
(c)

| F/S | B1 | T2 | B2 | T4 | T5 | B3 |

0000  0110  0250  0360  0440  0590  0800  0900

(b)

| B1 | 0110 | 0250 |
|----|------|------|
| B2 | 0360 | 0440 |
| B3 | 0800 | 0900 |

(c)

| B1 | 0110 | 140 |
|----|------|-----|
| B2 | 0360 | 80  |
| B3 | 0800 | 100 |

FIG. 9
(a) 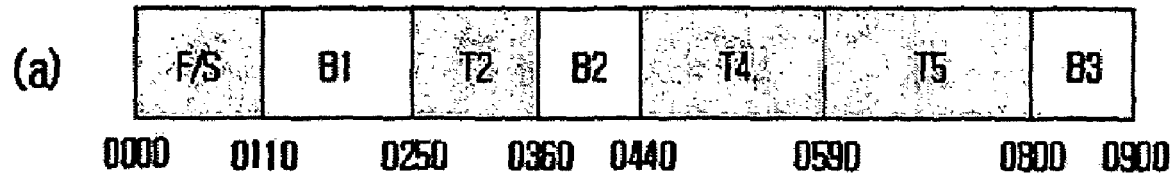
(b) 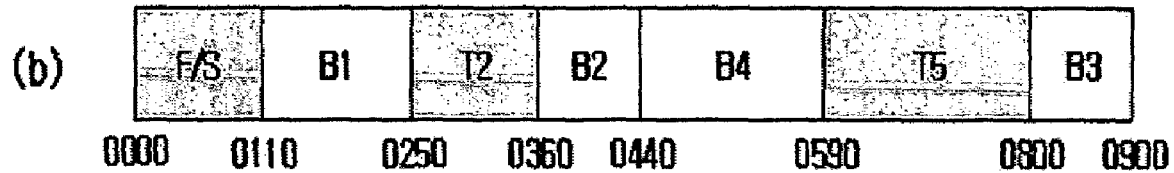
(c) 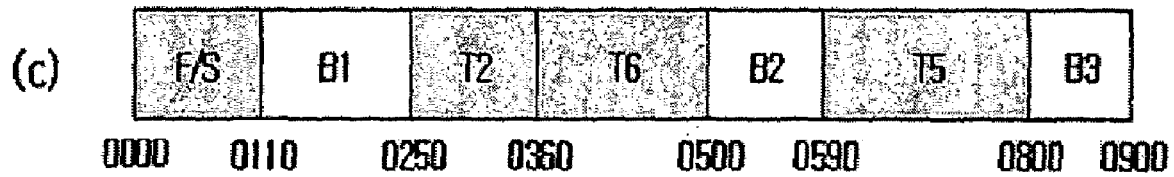

| B1 | 0110 | 140 |
|---|---|---|
| B2 | 0360 | 80 |
| B3 | 0800 | 100 |

(b)

| B1 | 0110 | 140 |
|---|---|---|
| B2 | 0360 | 230 |
| B3 | 0800 | 100 |

(c)

| B1 | 0110 | 140 |
|---|---|---|
| B2 | 0500 | 90 |
| B3 | 0800 | 100 |

RECORDING CONTROL AND SPACE AREA MANAGEMENT APPARATUS AND METHOD FOR RECORDING ADDITIONAL DATA ON A REWRITABLE OPTICAL MEDIUM

This application claims benefit under 35 U.S.C. § 119(a) from Korean Patent Application No. 2004-01111, filed on Jan. 8, 2004, the entire content of which is incorporated herein by reference.

BACKGROUND OF THE INVENTION

1. Field of the Invention

The present invention relates generally to a recording control method and a space area management method for recording additional data on a rewritable optical medium.

2. Description of the Related Art

A rewritable optical medium is an optical storage medium capable of writing/erasing/rewriting information by an optical means. For example, CD (compact Disc) and DVD (Digital Versatile Disc or Digital Video Disk) are widely used as the rewritable optical medium, and also optical media having a high-density such as Advanced Optical Disc (AOD) and Blue Ray Disc (BD) have been developed.

Specifically, in the case of DVDs, depending on a physical structure and recording mode, Digital Video Disk-Random Access Memory (DVD-RAM), Digital Video Disk-Rewritable(DVD−RW), and), Digital Video Disk+Rewritable (DVD+RW) are well known as the rewritable DVD.

For example, in the case of video data being written in the rewritable optical media, it is possible to record the video data by a 'title' part, to selectively erase it by a user, and to record additional data.

Hereinafter, with reference to FIG. 17, a description will be provided on the recording control method when writing an additional data according to the standards of DVD−RW and DVD+RW.

As shown in FIG. 17(a), according to DVD−RW and DVD+RW industry standards, the disc comprises a Power Calibration Area (PCA), a Record Management Area (RMA), a Lead-in (L/I) Area, a Data Area and a Lead-out (L/O) Area. As shown in FIG. 17(b), the Data Area includes a file system (F/S) and a plurality of titles (T1-T5).

FIG. 17(c) illustrates one title T3 of the plurality of titles being erased. FIG. 17(d) illustrates a new title T6 being added according to DVD−RW industry standards. Where additional data is recorded according to DVD−RW standards, the additional data is always recorded immediately after the last written title.

FIG. 17(e) illustrates a new title T7 being added according to DVD+RW standards. Where additional data is recorded according to DVD+RW standards, the additional data can be written in the space area, but even an area in which the title has previously been written is over-written until the recording of additional data is completed.

As described above, in the case of the additional data being written later, there is a problem in that in accordance with DVD−RW standards, the intermediate area having the title erased is not able to be utilized, thereby degrading the recording efficiency, while there is a problem in that the data that has already been written are lost in accordance with the standards of DVD+RW.

SUMMARY OF THE INVENTION

The present invention has been developed in order to solve the above drawbacks and other problems associated with the conventional arrangement. Accordingly, the object of the present invention is to provide a recording control method for recording additional data by efficiently utilizing space in which valid data is not written.

Also, another object of the present invention is to provide a management method for efficiently utilizing space.

In order to accomplish the foregoing and other objects and advantages, the recording control method according to one aspect of the present invention comprises the steps of recognizing space blocks in which physically continuous valid data are not written and writing additional data in the recognized space block, wherein if that space block is full, the recording operation is no longer performed, thereby the recording operation is terminated.

That is, it is possible to efficiently utilize Data Area while not damaging data that has already written by allowing additional data to be written later in only the space blocks.

The space block refers to an area in which valid data is physically not written in succession. The valid data is defined as data registered in a file system or data that can be reproduced by a normal operation. According to an embodiment of the present invention, the space block indicates an area in which new data can be physically written in succession. There may be a plurality of such space blocks in the optical medium, and hereinafter, all of the space blocks present in one optical medium are collectively referred to as the space area. That is, the space area inclusively refers to a rewritable area.

It is preferable to use space area information having positional information on each of the space blocks. In the case of the space area information being stored in a prescribed area of the optical medium, it is possible to read the space area information and use it; but in the case of the space area information not being stored, it is possible to prepare the space area information using the playback control information of the recorded data such as the file system. Of course, during the initial recording, it is preferable to generate the space area information and store the generated space area information in the optical medium.

Alternately, it is possible to detect any space block and perform the recording operation when receiving the recording command. In the case of the space area being recognized, it is possible to select any space block of the plurality of space blocks and perform the recording operation.

However, it is preferred to include the step of determining a target space block in which target data is to be written later, out of the plurality of space blocks. The target space block denotes a space block in which additional data is to be written later, and the target data indicates additional data to be written later. The target space block may be determined by the user, or may be automatically determined according to the predefined conditions. Preferably, in the case of the size of the target data being able to be determined in advance, the smallest space block of the space blocks having a larger size than the determined size is selected as the target space block; in the case that there are no space blocks having a larger size than the predetermined size or the size of the target data can not be determined in advance, the largest size of the space block is determined as the target space block.

The recording control method according to another aspect of the present invention comprises the steps of determining a new target space block and continuing the recording of the target data, in the event where the target space block is full and the recording operation is terminated.

The space area management method according to still another aspect of the present invention comprises the steps of updating the space area information for every recording and erasing data; and recording the space area information in the optical medium when a prescribed command is input.

By keeping the space area information having the positional information of the space block in the optical medium, it is possible to read and use the space area information when recording additional data later.

The prescribed commands include, for example, a disc eject command, as well as finalize command and user's recording command. Of course, it is possible to automatically record and store the space area information for a certain period. Also, the prescribed area includes an area near the area in which data is written or RMA defined in Digital Video Disc-Random Access Memory/–ReWritable/+ReWritable (DVD-RAM/–RW/+RW). Of course, it is possible to record the space area information in other areas.

The recording control method according to still another aspect of the present invention is characterized by comprising the steps of reading out space area information from a prescribed area of an optical disc, determining the target space block to initiate the recording operation when the recording command is input, ending the recording operation if all the data are recorded or the target space block is full, and registering the recorded data as new title to update the file system.

Further, it is desirable to update the space area information for every write/erase operation, and allow the space area information to be recorded in the prescribed area of the optical disc when the prescribed command is input.

The recording control method according to still another aspect of the present invention comprises the steps of providing a user with space area information, and writing data in the space blocks selected by the user. Further, when the user selects a plurality of space blocks, the recording operation is sequentially performed on the selected space blocks.

BRIEF DESCRIPTION OF THE DRAWINGS

The above aspects and features of the present invention will be more apparent by describing certain embodiments of the present invention with reference to the accompanying drawings, in which:

FIG. 1 is a diagram illustrating an example of the system to which the present invention is suitably applied;

FIGS. 8 through 10 show an example and updating process of space area information, respectively;

Throughout the drawings, it should be noted that the same or similar elements are denoted by like reference numerals.

DETAILED DESCRIPTION OF THE PREFERRED EMBODIMENTS

Figure 2:
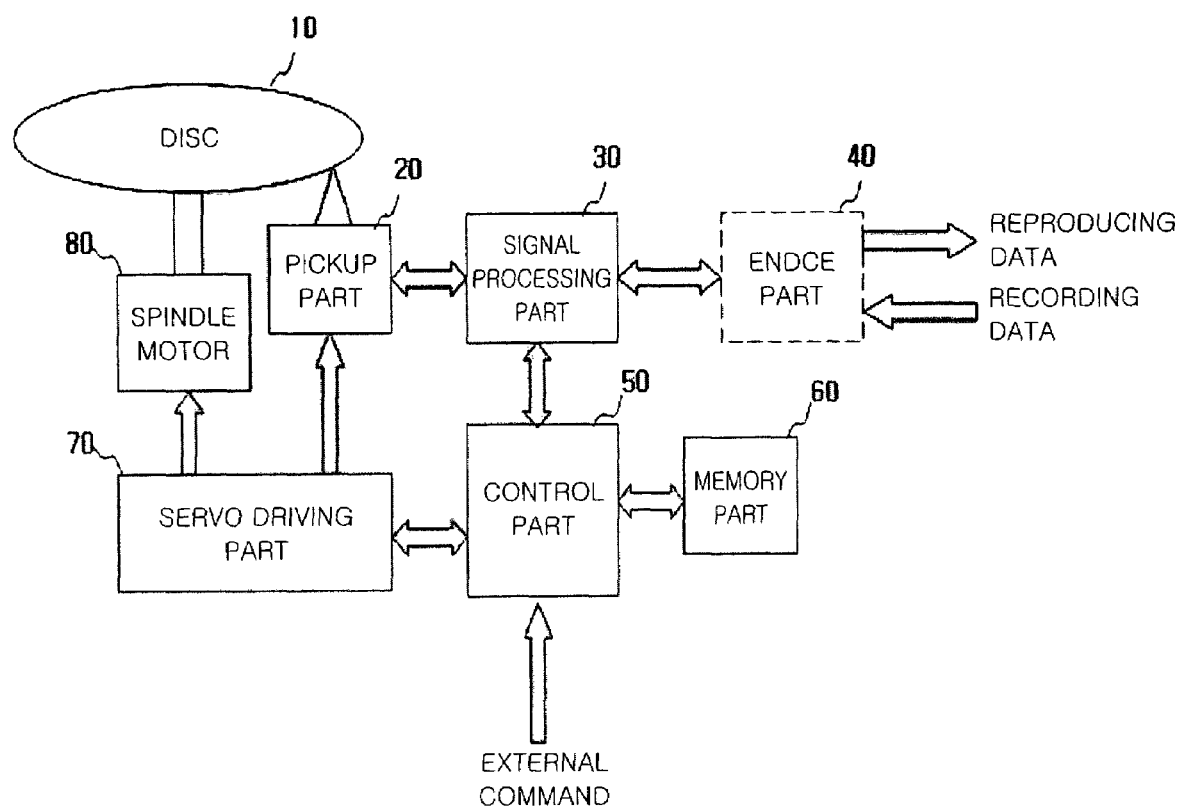
FIG. 2 is a diagram illustrating a configuration of an optical recording device to which the present invention is suitably applied.

Embodiments of the present invention will now be described in greater detail with reference to the accompanying drawings.

An embodiment of the present invention relates to a recording control method and a space area management method for recording additional data later on a rewritable optical medium. In the following embodiments, for example, the description will be provided using Digital Video Disc-Random Access Memory (DVD-RAM), –ReWritable (–RW) and +ReWritable (+RW) industry standards, and a DVD-recording device that records data according to these standards.

Various systems employing the optical recording device to which the present invention is applicable FIG. 1 is a diagram illustrating various forms of DVD-recording devices to which the present invention is applicable.

FIG. 1(a) illustrates a DVD drive 100 that is connected to a computer. The user inputs commands via interfaces such as a keyboard or a mouse connected to a main frame 110 of the computer body 110, and DVD drive 100 records and stores data transmitted from the main frame 110 of the computer in the disc according to the user's commands, with the recorded data being various forms of video data, program data, and the like.

FIG. 1(b) shows a broadcasting receiving antenna 220 and DVD reproducing/recording device 200 connected to a TV. DVD reproducing/recording device 200 performs reproducing/recording operations according to commands input via buttons provided on its body or a remote control, wherein the recorded data includes mainly the broadcasting data input via the broadcasting receiving antenna 220, but it is possible to receive data via an external input terminal and record the data on the disc.

FIG. 1(c) shows DVD recording device 300 that is connected to a hard disk drive 310. The user may record data stored in the hard disk drive 310 on the disc, wherein the recorded data mainly includes, but is not limited to, broadcast data.

FIG. 2 is a diagram illustrating a configuration of an optical recording device to which the present invention is suitably applied.

As shown in FIG. 2, the optical recording device comprises a spindle motor 80 for rotating a loaded disc 10, a pickup part 20 for reading/writing information from/to the disc 10, a signal processing part 30 for performing signal processing such as error correction, an ENDEC part 40 for performing compression/decompression operations on data, a control part 50 for controlling recording/reproducing operations, a memory part 60, and a servo driving part 70. In the case of a DVD drive being connected to the computer, ENDEC part 40 may be incorporated in the main frame of the computer.

The brief process for reproducing data is as follows: When the pickup part 20 reads-in data that is recorded in the disc 10 and sends it to the signal processing part 30, the signal processing part 30 performs the processing such as error correction on the data and then sends the data having the error correction processed to ENDEC part 40. ENDEC part 40 decompresses the compressed data and outputs the data.

The brief process for recording data is as follows: When data to be recorded input, ENDEC part 40 compresses the data and sends the compressed data to the signal processing part 30, and the signal processing part 30 performs a predetermined signal processing and then sends the processed data to the pickup part 20. The pickup part 20 emits laser beam depending on the input signal on the disc and records the data.

The reproducing/recording processes described above are performed by the control part 50.

With the recording control method and the space area management according to an embodiment of the present invention, if the recording command is input, the control part 50 recognizes a space area, determines a target space block in which additional data is to be written, and then allows the input additional data to be recorded in the target space block of the disc via the ENDEC part 40, the signal processing part 30, and the pickup part 20. During the recording, the control part 50 monitors the position where the recording operation is currently performed, and allows the recording operation to end if the target space block is full. The space area is recognized by reading-out the space area information from the disc, or generating the space area information and storing it in the memory part 60. Each time the recording and erasing operations are performed on the data, the control part 50 allows the space area information stored in the memory part 60 to be updated.

Hereinafter, a description will be provided on the recognition of the space area, the determination of the target space block, and the updating of the space area information. It should be noted that the description below can easily be applied to an optical device by those skilled in the art.

Embodiment 1

Figure 3:
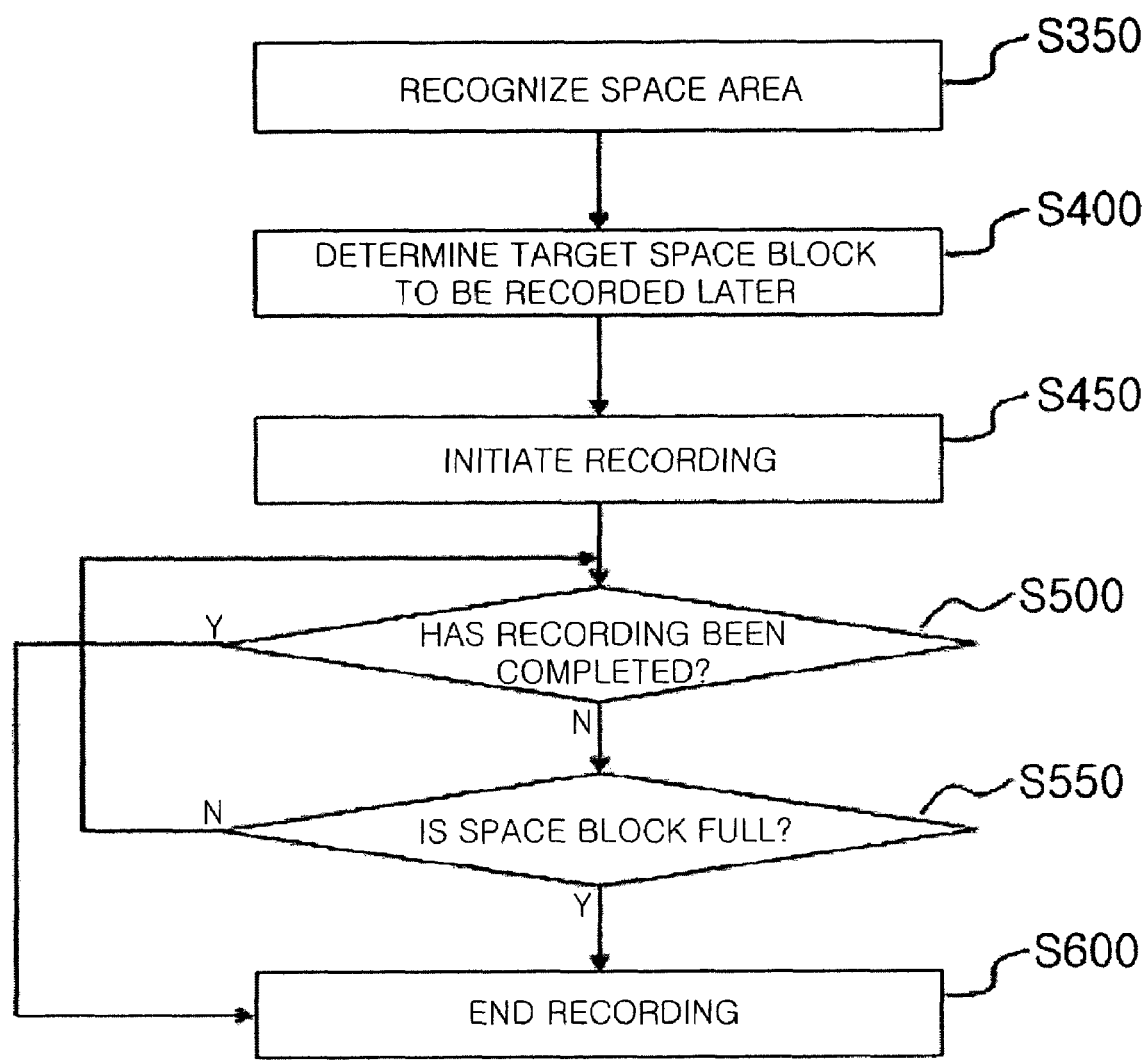
FIG. 3 is a flow chart illustrating for explaining the first embodiment of the recording control method according to an embodiment of the present invention.

FIG. 3 is a flow chart for explaining one embodiment of the present invention.

The recording control method according to this embodiment recognizes space area at step S350, determines target space block in which additional data is to be written later at step S400, and begins the recording at step S450. Then, the method confirms that all of the additional data are written at step S500 and ends the recording operation if the recording has been completed at step S600. If not, the method confirms that the target space block is full while continuing the recording operation at step (S550) and ends the recording operation if the space block is full (S600).

In other words, the additional data is to be written only in the target space block, and if the target space block is full, even though the additional data still remains, the recording operation is forcibly terminated.

While this embodiment recognizes the space area at step S350 and determines the target space block at step S400, it is not necessary to pass through these processes. For example, when the recording command is input, it is also possible to check the space block and begin the recording of data in any selected space block.

Recognition of Space Area

The space area may be recognized in different ways. In the simplest manner, it is possible to scan and recognize the disc, but in accordance with the standards of the current DVD-RAM, −RW, and +RW, since only the file system is updated without the real data being erased even if the title is erased, it is not possible to completely recognize the space area only by scanning the disc. Accordingly, in the case employing the standards of DVD-RAM, −RW, and +RW, it is desirable to reference the file system and recognize the space area. Of course, in the case of the space area information being previously stored in the disc, it is possible to read the space area information to recognize the space area. The space area information collectively refers to the positional information on each of the space blocks constituting the space area.

Figure 4:
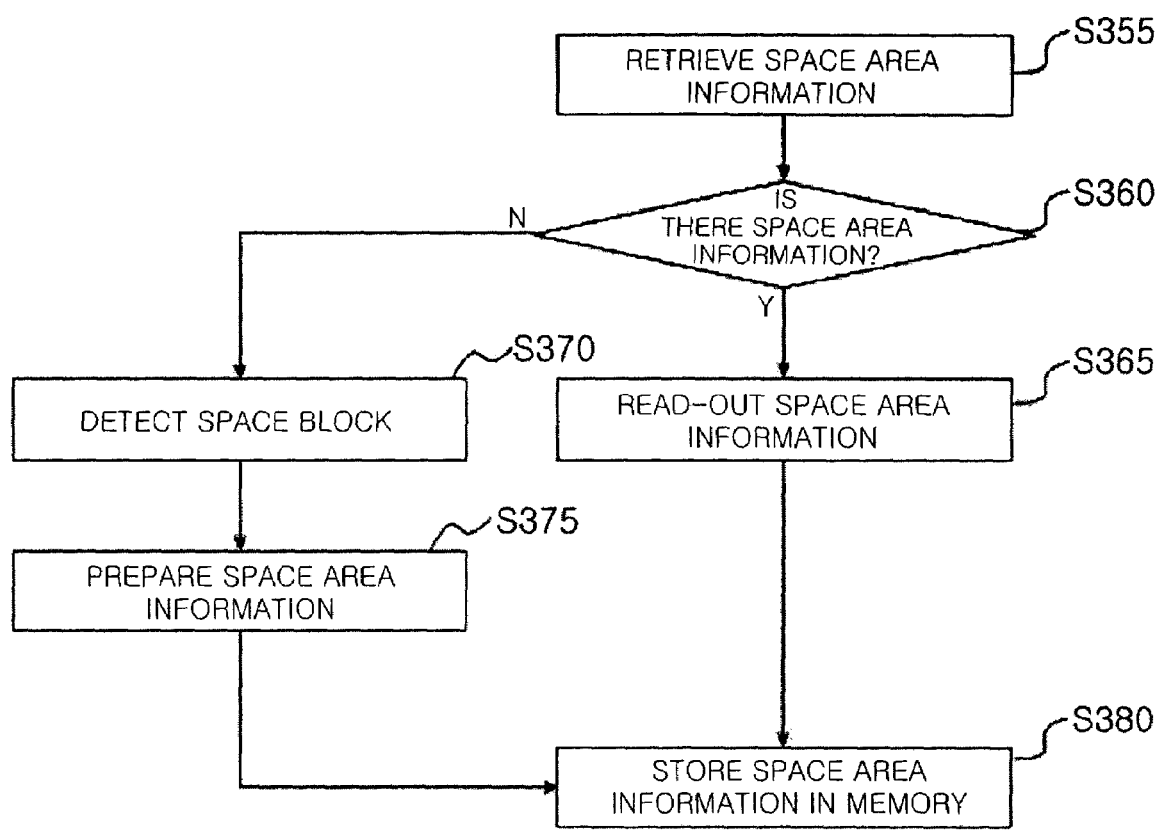
FIG. 4 is a flow chart for explaining an example of the process of recognizing space area according to an embodiment of the present invention.

FIG. 4 shows a preferred example for recognizing space area.

With reference to FIG. 4, firstly, the space area information is retrieved from the disc at step S355, and it is confirmed that the space area information was previously written in the disc at step S360. If the space area information was previously written, the information is read at step S365 and stored in the memory at step S380. If the information is not found in the disc, after detecting the space block at step S370, the space area information is newly prepared at step S375, and then the information is stored in the memory at step S380.

The processes for recognizing the space area described so far are applicable in recognizing the space area in all embodiments of the present invention.

Determination of Target Space Block

The target space block may be also determined in different ways. Simply, it is possible to display the space area information to a user and allow the user to select the target space block. Alternatively, it is also possible to uniformly define the foremost space block or the largest size of space block as the target space block.

Figure 5:
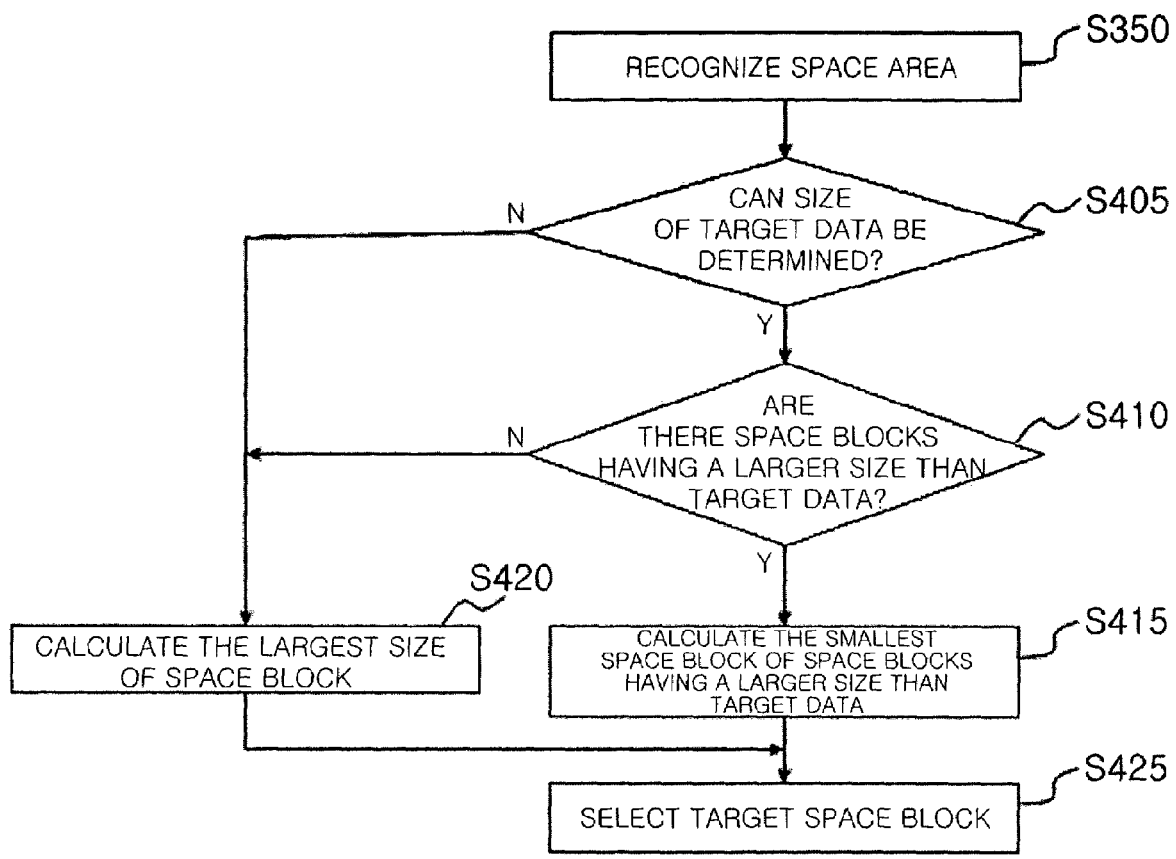
FIG. 5 is a flow chart for explaining an example of the process of determining target space block according to an embodiment of the present invention.

However, in order to more efficiently use the space area, it is preferable to consider the size of the target data. FIG. 5 is a flow chart illustrating an example for determining the target space block.

With reference to FIG. 5, after recognizing the space area at step S350, it is determined if the size of target data to be written later can be determined at step S405. In the case of the size of target data being not able to be determined, the largest size of space block is calculated at step S420 and the calculated block is determined as the target space block at step S425. In the case of the size of target data being able to be determined, it is determined if there are space blocks having a larger size than the target data at step S410. If not, the largest size of space block is calculated at step S420 and the calculated block is determined as the target space block at step S425. If yes, the smallest space block of the space blocks having a larger size than the target data is calculated at step S415 and the calculated block is determined as the target space block.

If the size of target data can be determined, for example, data stored in the computer may be recorded as shown in FIG. 1(*a*), or data stored in hard disk drive may be recorded in the disc as shown in FIG. 1(*c*). If the size of target data can not be determined, for example, broadcasting data may be recorded in the disc to telerecord it as shown in FIG. 1(*b*). However, since even if the data is the broadcasting data, its size may be previously determined, and even if the data is stored in the hard disk drive, its size may not be previously determined, it is not desirable to uniformly define the size of data according to the data source.

The processes for determining the target space block described so far are applicable in determining the target space block in all of the embodiments of the present invention.

Embodiment 2

Figure 6:
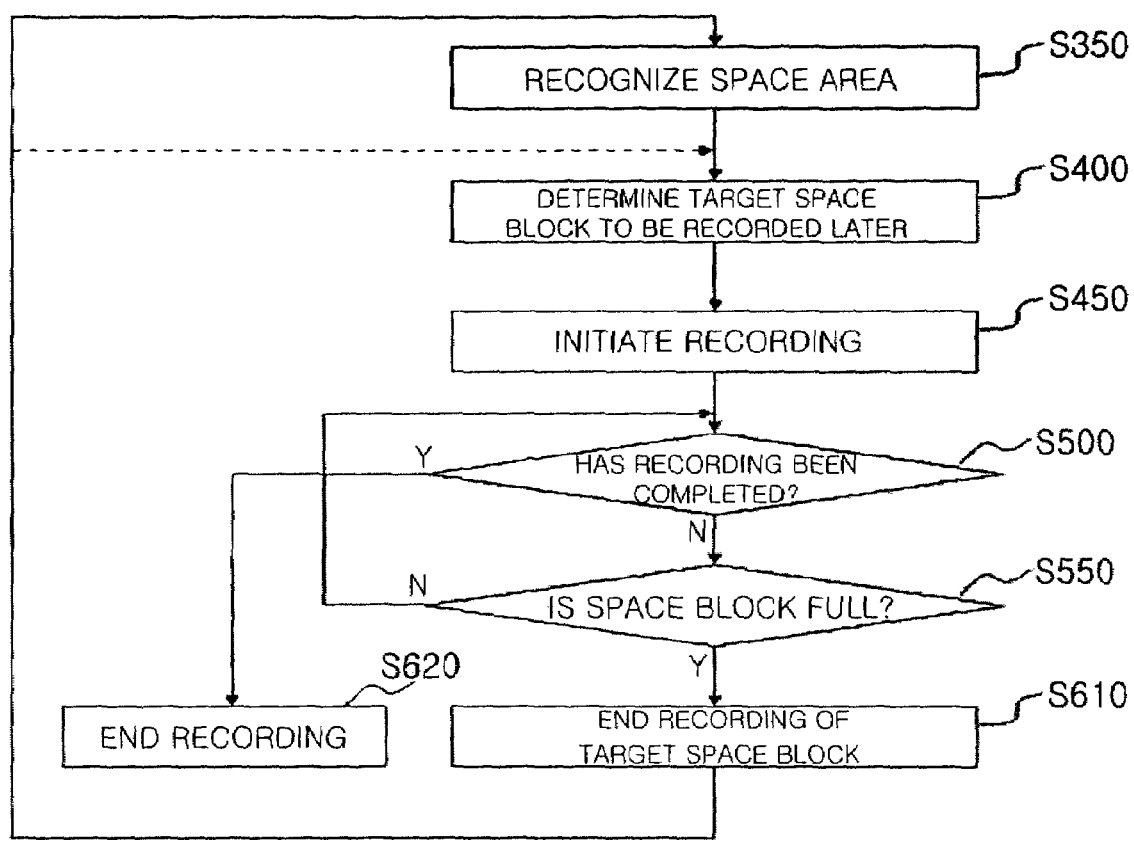
FIG. 6 is a flow chart for explaining the second embodiment of the recording control method according to an embodiment of the present invention.

FIG. 6 is a flow chart for explaining another embodiment according to the present invention.

This embodiment differs from the embodiment 1 in that if the target space block is full, the recording of data is continued by newly determining other target space blocks. But, it is similar to the embodiment 1 in that the space area is recognized, the target space block is determined, and the recording on the target space block is terminated when that target space block is full.

However, in this embodiment, if determining that the target space block is full at step S550, the recording operation is terminated at step S610, and then the recording operation is resumed by determining a new target space block at step S400. While recording at step 450 and determining the new target space block in this manner, if all of the data have been recorded or the cease command is input by the user, it is determined as having the recording completed at step S500, thereby the recording operation ends at step S620.

At this time, in the case of the recorded data being video data, the data recorded in space blocks that are physically not continuous is registered as a separate title.

Embodiment 3

Figure 7:
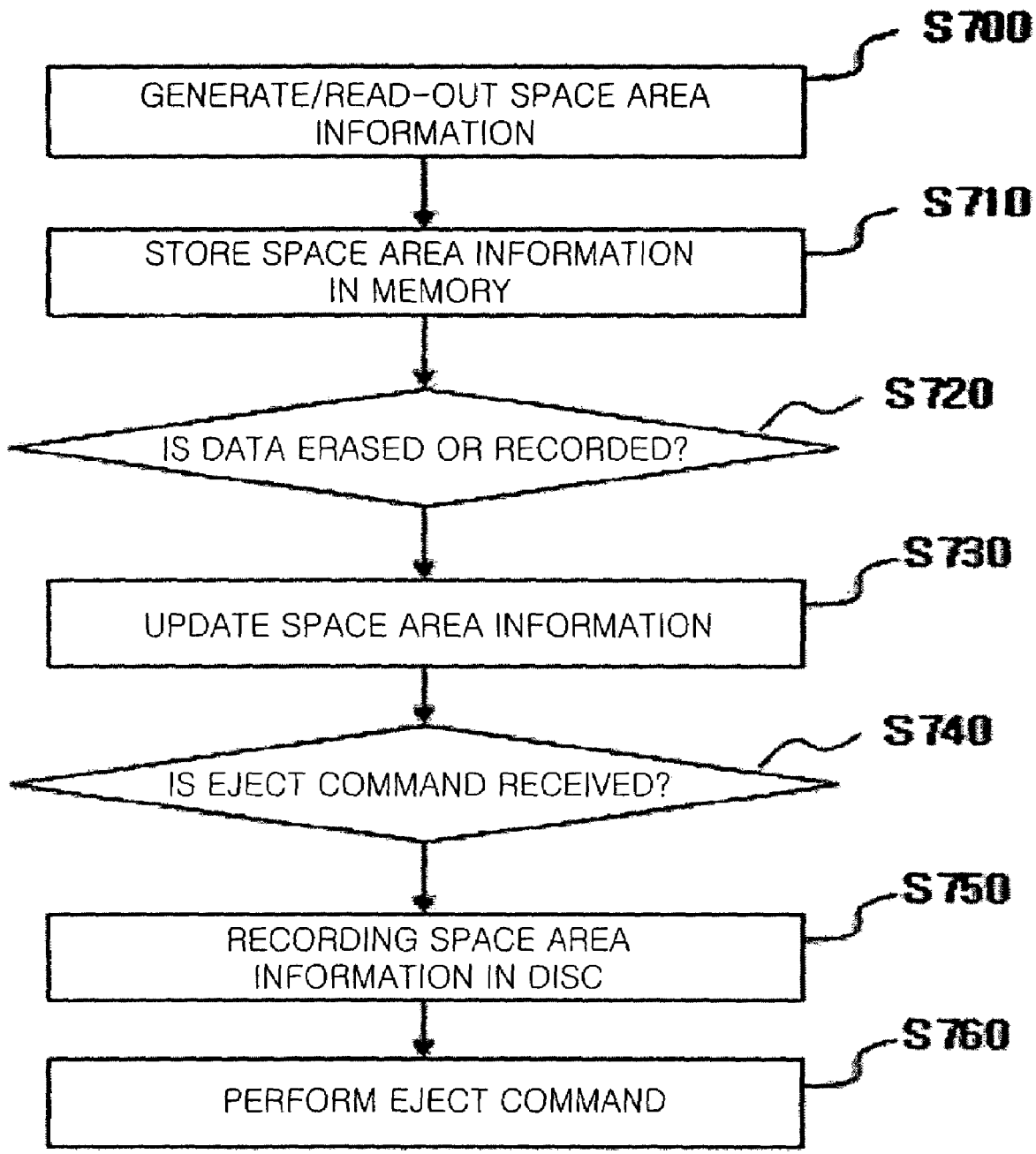
FIG. 7 is a flow chart for explaining the third embodiment of the space area management method according to an embodiment of the present invention.

This embodiment describes a space area management method, and the description thereof will be made with reference to FIG. 7.

In accordance with this embodiment, when the optical medium is loaded, the space area information is retrieved therefrom and read, and if the space area information is not found, the space area information is newly generated at step S700. The generated or read space area information is stored in the memory at step S710, and if the erasing or recording operation is performed on data at step S720, the space area information is updated at step S730. The updated space area information is stored in the memory. When the eject command is input at step S740, the space area information is recorded on the disc at step S750, and then the eject command is performed at step S760.

Hereinafter, with reference to FIG. 8 through 10, a description will be provided of an example of the space area information and the updating process. The example of the space area information and the updating process described below are applicable for using the space area information and updating it in other embodiments of the present invention.

Space Area Information

FIG. 8 shows an example of the space area information according to an embodiment of the present invention.

FIG. 8(a) conceptually shows the Data Area of the optical medium, with F/S indicating a file system; T2, T4 and T5 indicating titles, respectively; B1, B2, and B3 indicating space blocks, respectively. The numbers indicated below each boundary line refers to an address. The address differs from the actual address used in the optical medium such as DVD, and for explanation is optionally defined. In the optical medium such as the DVD, the positional information on each of the space blocks can be indicated using the physical or logical address defined in the standards.

FIG. 8(b) illustrates an example of the space area information for the optical medium of FIG. 8(a). The space area information in FIG. 8(b) has the starting address and ending address for each of the space blocks (B1, B2, B3) as the positional information.

FIG. 8(c) illustrates another example of the space area information for the optical medium of FIG. 8(a), wherein the space area information has the starting address and size for each of the space blocks (B1, B2, B3) as the positional information.

Updating of Space Area Information

FIG. 9 and FIG. 10 are views for explaining the updating of the space area information according to an embodiment of the present invention.

FIG. 9(a) is a diagram illustrating the Data Area of the optical medium.

FIG. 9(a) conceptually shows the data area of the optical medium, wherein F/S indicates the file system; T2, T4 and T5 indicate valid titles, respectively; B1, B2, and B3 indicate space blocks, respectively. Herein, the space area information is the same as that of FIG. 10(a). The space area information FIG. 10(a) has the starting address and size for each of the space blocks.

FIG. 9(b) illustrates title T4 being removed from the optical medium of FIG. 9(a). The space block B4 is generated by removing the title T4. However, since the space block B4 is adjacent to space block B2, it is desirable to handle these blocks as one space block without handling as individual space blocks. FIG. 10(b) shows the space area information for FIG. 9(b). The space area information is updated by changing the size value of the space block B2 without separately including the positional information for a new space block B4. That is, B2 and B4 in FIG. (b) are treated as one B2.

FIG. 9(c) illustrates a new title T6 being added in the optical medium of FIG. 9(b). In recording the new title T6, target space block is determined by referring to the space area information of FIG. 10(b), wherein the largest size of space block B2 is determined as the target space block in the embodiment. Since the new title T6 is not greater than the entire size of the target space block B2, the space block where the recording is not performed remains even after the recording has been completed. In this case, the remaining space is intended to indicate the space area information. FIG. 10(c) shows the space area information for FIG. 9(c). FIG. 10(c) indicates the starting address and the positional information for the space block B2 having the size value changed.

As described above, the space area information is updated for every erasing and writing of data. Also, preferably, the space area information is stored in the memory, and when ejecting or finalizing the disk or according to the user's command, the space area information is regularly written to in a given area of the disk.

Embodiment 4

Figure 11:
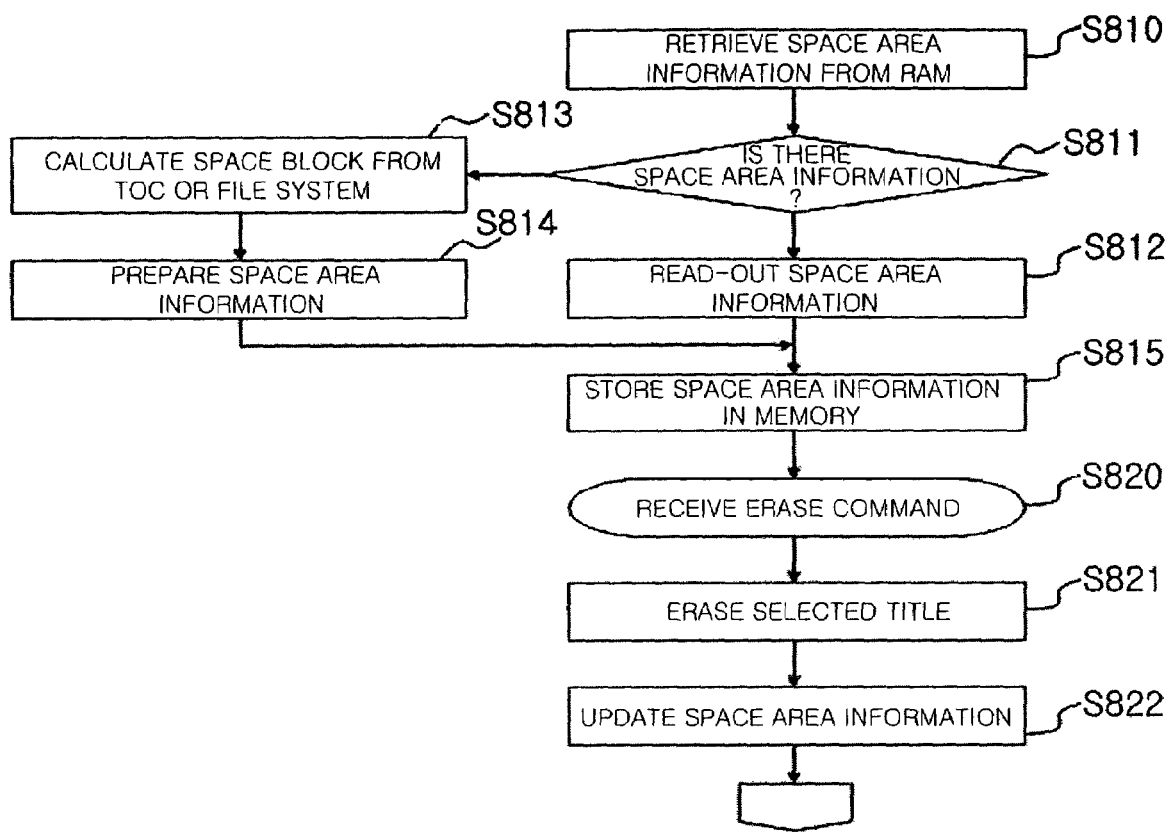
FIGS. 11 through 13 are flow charts for explaining the fourth embodiment of the recording control method according to an embodiment of the present invention.
Figure 12:
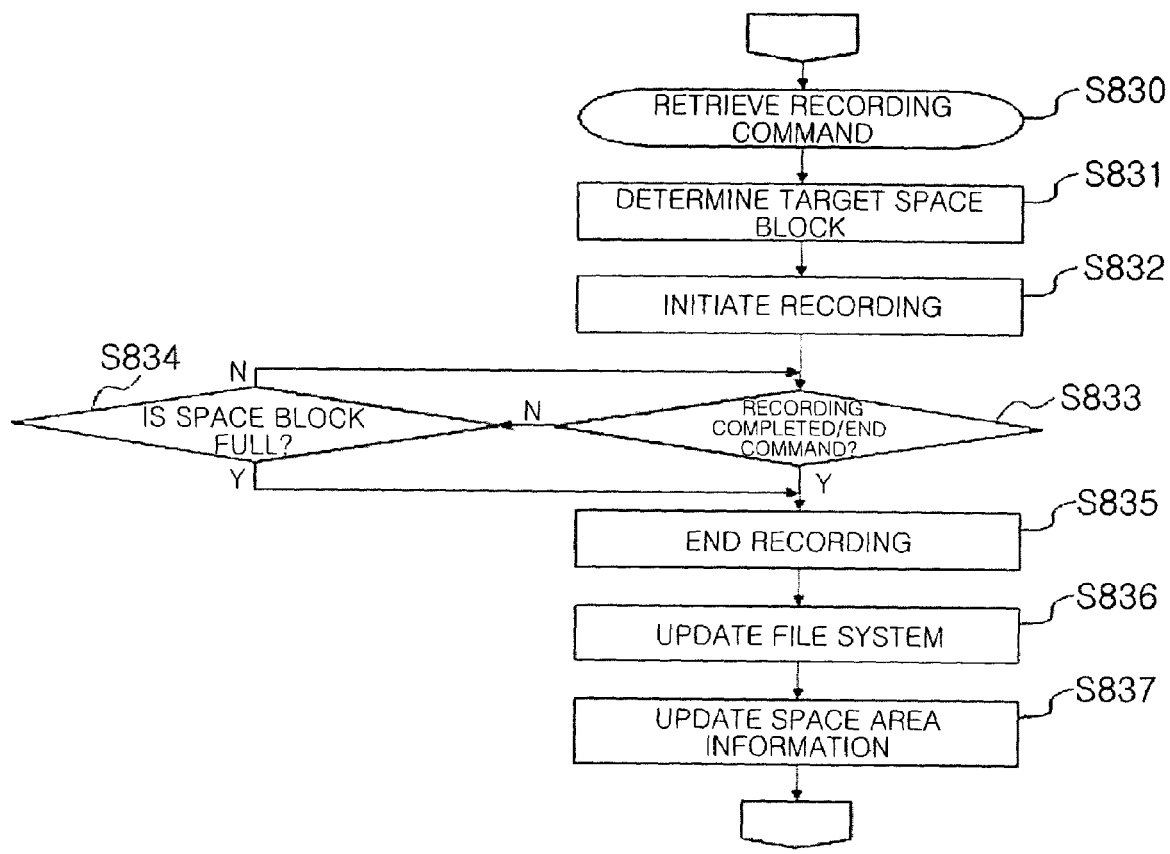
Figure 13:
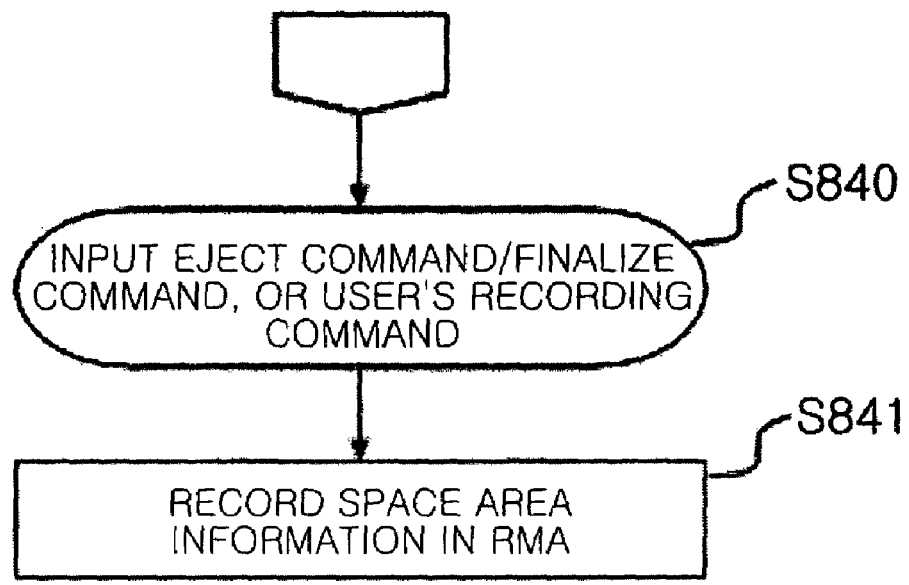

The embodiment describes the recording control method of the case where the present invention is applied to DVD recording device. With reference to FIG. 11 to FIG. 13, the description will be made on the recording control method.

With reference to FIG. 11, firstly, space area information is retrieved from Random Access Memory or Recording Management Area (RAM) in order to recognize the space area at step S810. Of course, the determination on which area of the space area information is to be retrieved from depends on which area of the space area information is to be stored in. Which area of the space area information is to be stored in is a matter of choice, but it is not required to determine which area is more efficient. It is possible to store the space area information in the space area of the Data Area or in the area randomly usable by the user of the areas defined in the other standards.

It determines whether there is space area information by retrieving the space area information at step S811.

If it is determined that there is no space area information, the space block is calculated at step S813 from TOC or the file system, the space area information is prepared based on the calculated space block at step S814, and then the prepared space area information is stored in the memory at step S815.

Of course, if there is space area information, the space area information is read at step S812, and is stored in the memory at step S815.

After storing the space area information in the memory, whenever erasing and recording commands are input, the space area information is updated.

Firstly, when the erasing command is input at step (S820), the selected title is erased at step S821 and the space area information is updated at step 822. Since the description on how to update the space area information has been explained above, a detailed description thereof will be omitted.

With reference to FIG. 12, when the recording command is input at step S830, the target space block is determined at step S831. The phrase "when the recording command is input" refers to the input of the additional recording command. Also, since the description on how to determine the target space block has been explained above, a detailed description thereof will be omitted. If the target space block is determined, the recording operation is initiated at step S832, and it determines whether the recording has been completed at step S833. In the case where the recording has been not completed, it determines if the space block is full at step S834. The recording operation continues if the recording has been not completed and the space block is not full, but the recording operation ends if the recording has been completed and the space block is full at step S835. The passage "if the recording has been completed" indicates that all of the data to be written are recorded, or the recording operation has ceased according to a given command. If the recording operation has ended, the file system is updated at step S836, the additionally recorded data is registered as valid data, and the space area information is updated at step S837. Since the description on how to update the space area information has been explained above, a detailed description thereof will be omitted. In the case where the additionally recorded data is, but is not limited to, video data, the embodiment of the present invention increases in utilization. In case of the video data, it is required that the video data be continuously recorded for playback compatibility. In particular, in the event that the broadcasting data is received to be telerecorded, the utilization of the embodiment of the present invention becomes greater. If the broadcasting data that is not capable of determining its size is written later, in accordance with an embodiment of the present invention, it is possible to make the most of space areas and prevent the already recorded data from being lost.

With reference to FIG. 13, if the eject command/the finalize command the user's recording command on the disc are input at step S840, the space area information is written in RMA at step S841. Of course, as explained in the above, the space area information is not necessary to be written in RAM.

The term "the user's recording command" refers to the command causing the space area information to be written in the disk.

Embodiment 5

Figure 14:
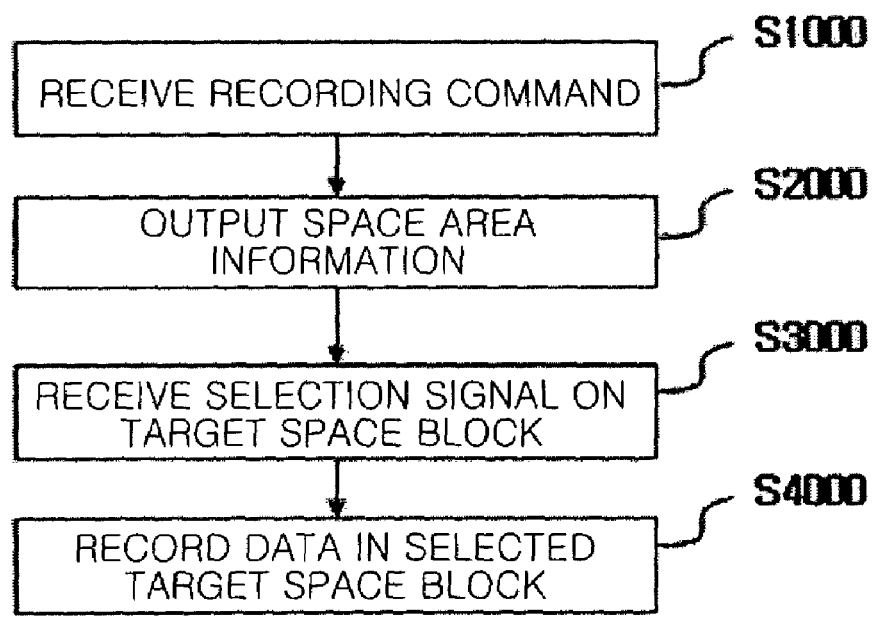
FIG. 14 is a flow chart for explaining the fifth embodiment of the recording control method according to an embodiment of the present invention.

The present embodiment describes a method for performing the recording later in the space block selected by the user with reference to FIG. 14.

In accordance with an embodiment of the present embodiment, firstly, when the recording command is received at step S1000, the space area information is output at step S2000. When the selection signal for the target space block is received from the user at step S3000, data is written in the selected target space block at step S4000. While the recording command is received at step S1000, and then the space area information is output, it is possible to receive the output command for the space area information, output the space area information, receive the selection signal for the target space block, receive the recording command from the user, and record the space area information. However, in the present embodiment, the order described above is not limited.

Further, the recording of data can be performed by the method described in the above embodiments.

Preferably, if the recording operation is terminated, the message is output which indicates the end of the recording.

If a plurality of space blocks are selected by the user, the recording on the plurality of space blocks selected is performed in sequence, and if the plurality of space blocks are full, the recording operation ends.

It is preferred to input titles from the user before or after the recording. At this time, if one title is input for the plurality of space blocks, for example, for data recorded in each of the space block, the titles are given such as 'title 1', 'title 2' by adding the number in sequence.

Modified Embodiment 1

In the recording control method according to the modified embodiment, if an additional recording command is input, the recording operation is performed by detecting any space block in which data is to be written, and if that space block is full during the additional recording, the recording operation is terminated.

Figure 15:
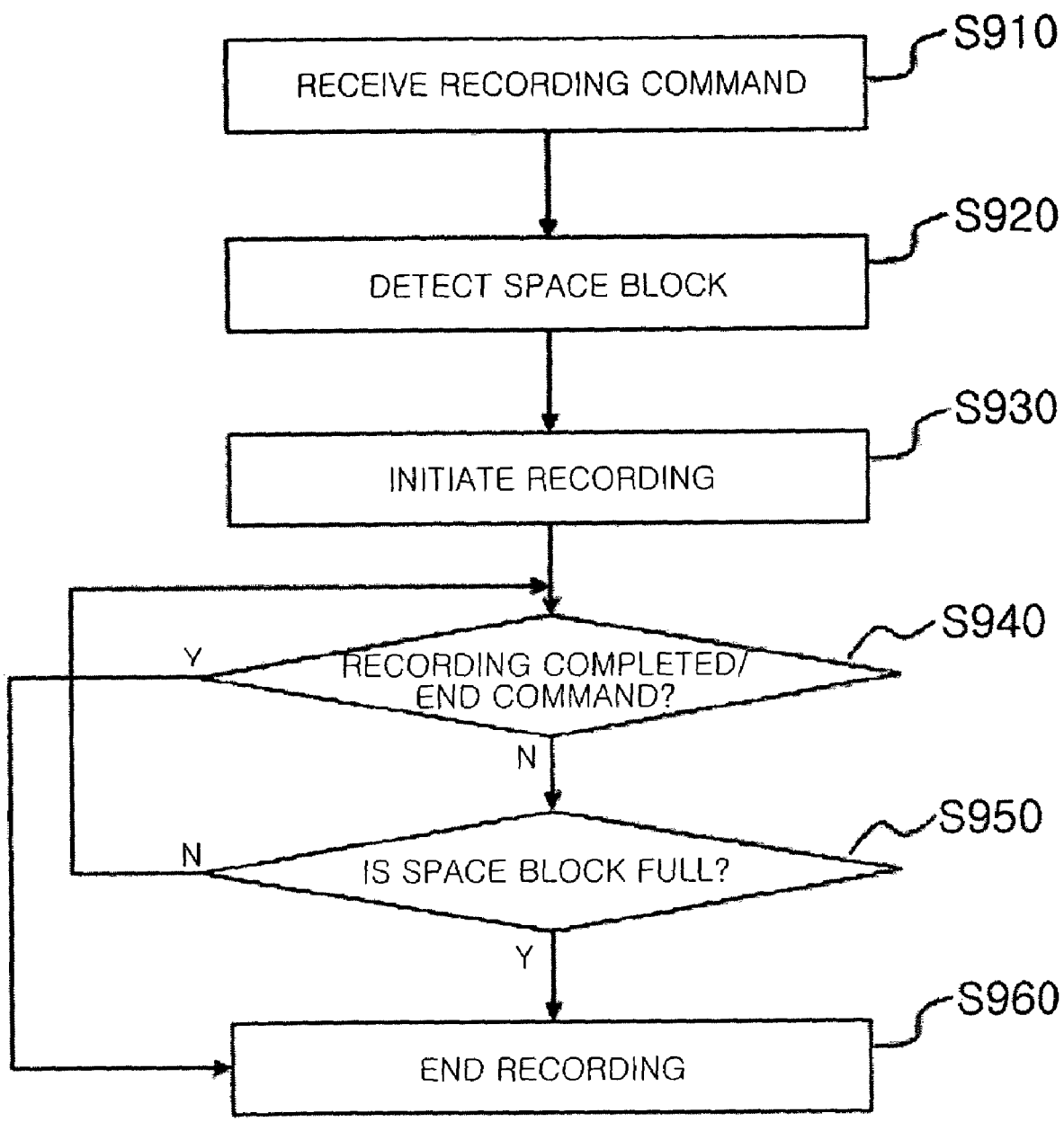
FIG. 15 is a flow chart for explaining the first modified embodiment of the recording control method according to an embodiment of the present invention.

In the modified embodiment, with reference to FIG. 15, the recording command is received at step S910, the remaining steps of performing the recording at steps S930, S940, S950, and S960 except for the step of detecting the space block at step S920 are similar to those of the embodiment 1. In other words, in the recording control method according to the modified embodiment, which one of at least one or more space blocks present in the optical medium is detected and the additional recording is performed. If there is no space block, the additional recording is not performed. If so, it is preferred to display the message of 'no additional recording is performed' and inform the user of the message.

By detecting the ending address of the space block in advance or detecting the starting address of the just next valid data, to compare these addresses with address under the recording, whether or not the space block is full can be determined.

Modified Embodiment 2

Figure 16:
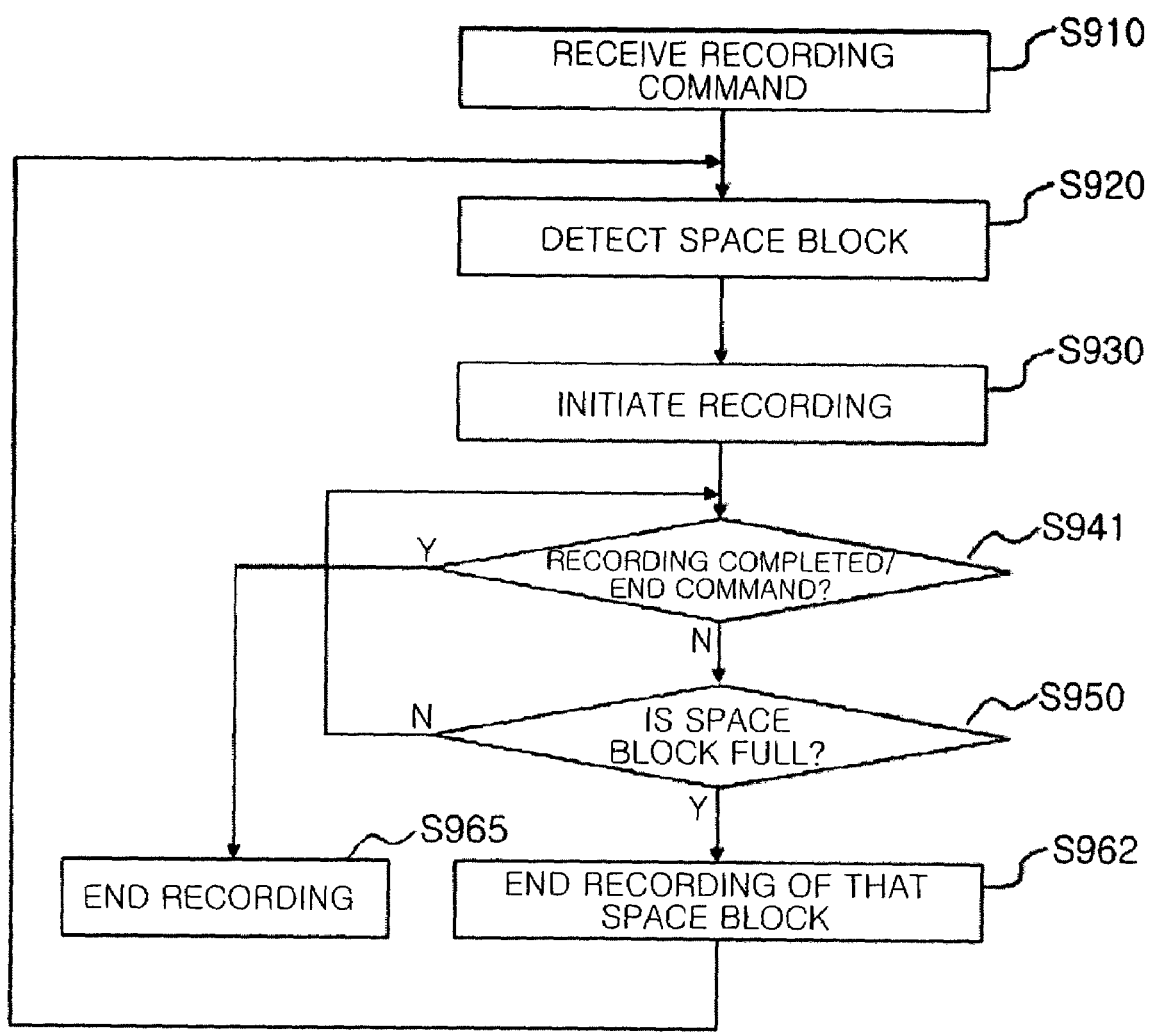
FIG. 16 is a flow chart for explaining the second modified embodiment of the recording control method according to an embodiment of the present invention.
Figure 17:
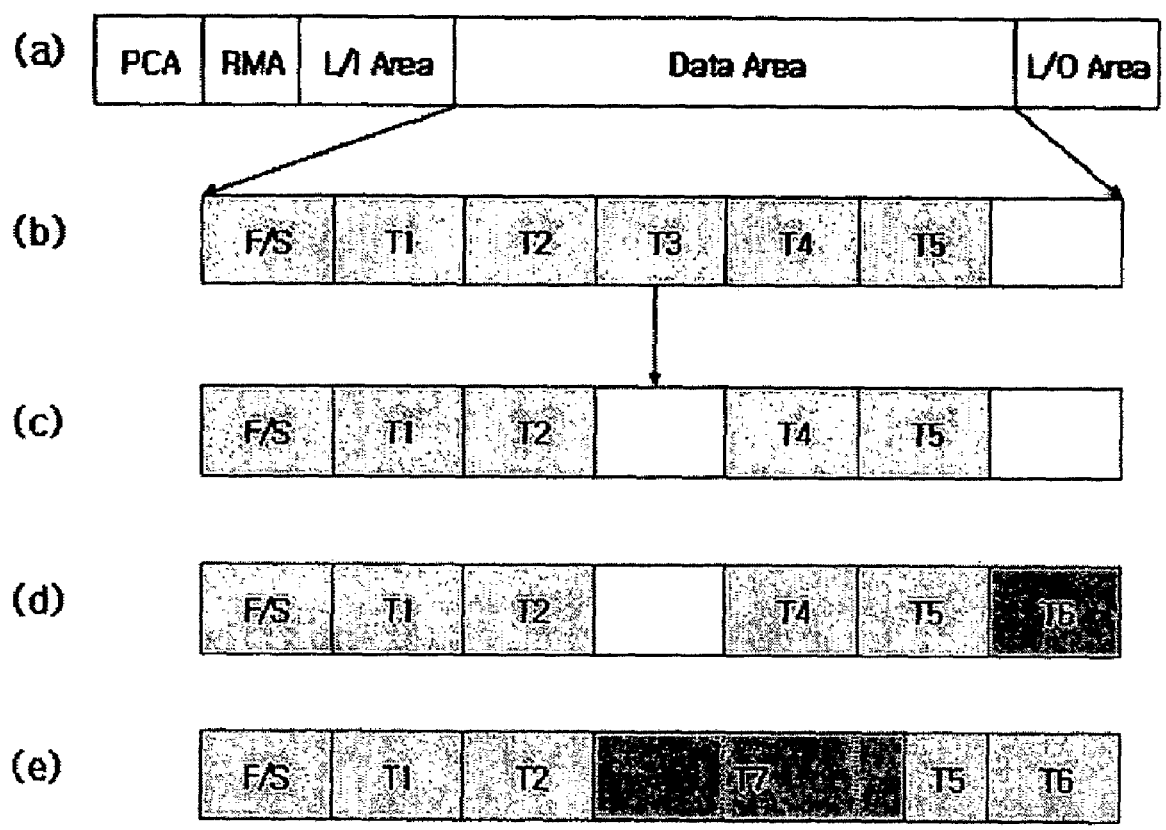
FIG. 17 is a diagram illustrating a conventional shows explaining the prior art recording control method.

In the recording control method according to the modified embodiment, with reference to FIG. 16, if an additional recording command is input at step S910, the recording operation is initiated at step S930 by detecting any space block in which data is written at step S920. The subsequent steps S941, S950, S962, and S965 are similar to those of the embodiment 2. That is, if that space block is full during the additional recording, the recording operation is terminated, and then another space block is detected to perform the recording.

Preferably, until all of the additional data are recorded, the user ceases the recording, or there are no space blocks any more, the processes for detecting the space block and performing the recording are repeated.

The utilization of the embodiments of the present invention is very high, but is not limited to, when recording data, especially, video data and broadcasting data, are written to later in a rewritable optical medium.

In accordance with one aspect of the present invention, it is possible to manage the space area of the optical medium, utilize the space area while maintaining the already recorded data at the time of recording, and perform the recording, thereby improve the recording efficiency.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations should be apparent to those skilled in the art.

What is claimed is:

1. A recording control method for recording additional data on a rewritable optical medium, comprising the steps of:
   recognizing a space area including space blocks in which physically continuous valid data is not written;
   determining a target space block in which target data is to be written later, out of the space blocks; and
   initiating a recording of the target data in the target space block,
   wherein if the target space block is full during the recording of the target data, the recording operation is terminated; and
   wherein the step of determining comprises the step of determining the target space block to be the smallest space block from the space blocks having a larger size than the size of the target data if the size of the target data to be recorded can be determined, and determining the target space block to be the space block having the largest size if the size of the target data to be recorded cannot be determined or if none of the space blocks are larger than the size of the target data.

2. The method as claimed in claim 1, wherein the step of recognizing comprises the step of recognizing the space area by using space area information having positional information on each of the space blocks.

3. The method as claimed in claim 2, wherein the space area information is previously stored in the optical medium, or is generated by calculating the positional information for each of the space blocks from playback control information recorded in the optical medium.

4. A method as claimed in claim 1, wherein the step of determining comprises the step of determining the target space block according to a selection signal input from the user.

5. The method as claimed in claim 1, wherein the step of determining comprises the step of automatically determining the target space block according to predefined conditions.

6. A recording control method for recording additional data later on a rewritable optical medium comprising the steps of:
   recognizing a space area including space blocks in which physically continuous valid data is not written;
   determining a target space block in which target data is to be written later, out of the space blocks;
   initiating a recording of the target data in the target space block;
   ending the recording operation if the target space block is full during the recording of the target data;
   repeating the steps of determining, initiating, and ending in order to determine a new target space block to continue the recording operation, if the target space block is full in order to end the recording operation,
   wherein the recording operation is terminated when the recording of the target data is completed, an ending command is received, or there is no space block; and
   wherein the step of determining comprises the step of determining the target space block to be the space block having the largest size as the target block if the size of the target data to be recorded cannot be determined or if none of the space blocks are larger than the size of the target data, and the step of determining the target space block to be the smallest space block having a larger size than the size of the target data as the target block if the size of the target data to be recorded can be determined.

7. A recording control method for recording an additional title later on a rewritable optical medium comprising the steps of:
   reading space area information including positional information on a space block from the optical medium;
   determining a target space block in which an additional title is to be written by referring to the space area information if a recording command is input;
   initiating the recording of data input in the target space block;
   ending the recording operation, if all of the data input are recorded or the target space block is full; and
   registering the recorded data as a valid title;
   wherein the step of determining comprises the steps of selecting the target space block to be the block having the smallest size larger than the size of the data if the size of the additional data recorded is able to be determined, and selecting the target space block to be the block having the largest size if the size of the additional data recorded is not able to be determined or if none of the space blocks are larger than the size of the target data.

8. The method as claimed in claim 7, further comprising the step of generating space area information using playback control information of the optical medium, if the space area information is not able to be read out.

9. The method as claimed in claim 8, wherein the playback control information comprises a file system.

10. The method as claimed in claim 7, wherein the step of determining comprises the step of determining the target space block according to a selection signal input from the user.

11. The method as claimed in claim 7, wherein the step of determining comprises the step of automatically determining the target space block according to predefined conditions.

12. The method as claimed in claim 7, further comprising the step of updating the space area information if the recording and erasing are completed.

13. The method as claimed in claim 12, wherein the space area information comprises at least two or more information comprising the starting address, ending address and size for each of the space blocks.

14. The method as claimed in claim 12, further comprising the step of recording the space area information in the optical medium according to a prescribed command.

15. The method as claimed in claim 14, wherein the prescribed command comprises an eject command.

16. The method as claimed in claim 15, wherein the space area information is recorded after a last title of titles recorded in the optical medium.

17. The method as claimed in claim 15, wherein the space area information is recorded in a Recording Management Area (RMA).

18. A recording control method for recording additional data later on a rewritable optical medium comprising the steps of:
  outputting space area information according to a user's demand signal;
  receiving a selection signal on space blocks in which additional target data is to be written; and
  recording the target data in the selected space block;
  wherein the space blocks are selected by determining the smallest space block from the space blocks having a larger size than the size of the target data if the size of the target data to be recorded can be determined, and determining the space block having the largest size if the size of the target data to be recorded cannot be determined or if none of the space blocks are larger than the size of the target data.

19. The method as claimed in claim 18, wherein if a plurality of the space blocks are selected, the step of recording comprises the step of recording the target data in sequence in the plurality of space blocks.

20. An apparatus for recording additional data on a rewritable optical medium, comprising:
  a pickup part adapted to detect sections of the rewritable optical medium;
  a memory adapted to store space area information; and
  a controller adapted to recognize a space area including space blocks in which physically continuous valid data is not written, determine a target space block in which target data is to be written later from the space blocks and, initiate a recording of the target data in the target space block, wherein if the target space block is full during the recording of the target data, the recording operation is terminated,
  wherein the controller is further adapted to determine the target space block to be the smallest space block from the space blocks having a larger size than the size of the target data as the target space block if the size of the target data to be recorded can be determined, and to determine the target space block to be the space block having the largest size as the target space block if the size of the target data to be recorded cannot be determined or if none of the space blocks are larger than the size of the target data.

21. The apparatus as claimed in claim 20, wherein the controller is further adapted to recognize the space area by using space area information having positional information on each of the space blocks.

22. The apparatus as claimed in claim 21, wherein the space area information is previously stored in the optical medium, or is generated by calculating the positional information for each of the space blocks from playback control information recorded in the optical medium.

23. The apparatus as claimed in claim 20, wherein the controller is further adapted to determine the target space block according to a selection signal input from the user.

24. The apparatus as claimed in claim 20, wherein the controller is further adapted to automatically determine the target space block according to predefined conditions.

* * * * *

UNITED STATES PATENT AND TRADEMARK OFFICE
CERTIFICATE OF CORRECTION

PATENT NO. : 7,606,131 B2  Page 1 of 1
APPLICATION NO. : 10/947441
DATED : October 20, 2009
INVENTOR(S) : Sang-am Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1424 days.

Signed and Sealed this

Fifth Day of October, 2010

David J. Kappos
*Director of the United States Patent and Trademark Office*